Figure 1:
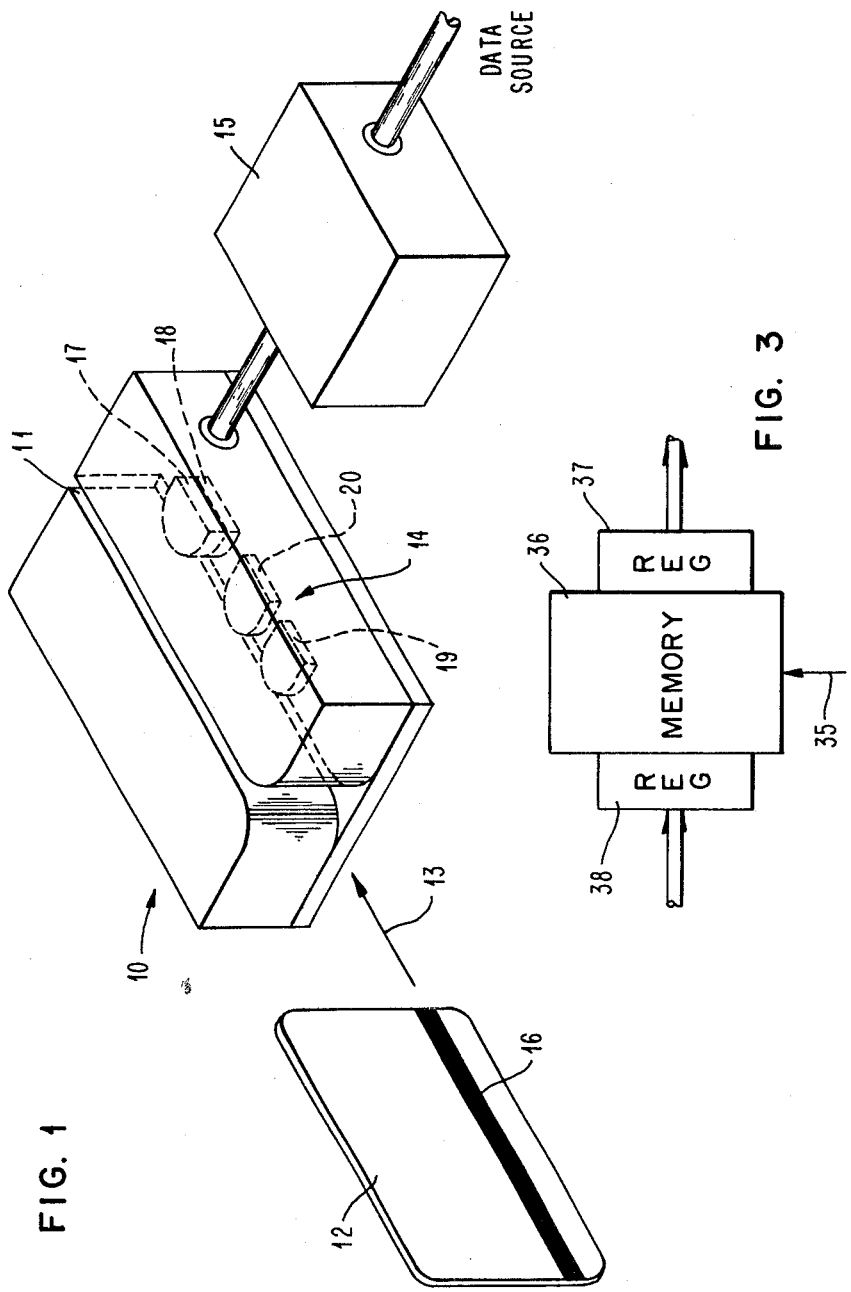

United States Patent [19]

Shay et al.

[11] 4,381,524
[45] Apr. 26, 1983

[54] SELF-CLOCKING WRITE HEAD

[75] Inventors: Robert J. E. Shay, Salisbury; Wendell L. Smith, Concord, both of N.C.

[73] Assignee: International Business Machines Corporation, Armonk, N.Y.

[21] Appl. No.: 214,317

[22] Filed: Dec. 8, 1980

[51] Int. Cl.³ .......................... G11B 25/04; G11B 5/09
[52] U.S. Cl. ......................................... 360/2; 235/482
[58] Field of Search ............... 360/2, 51, 73; 235/436, 235/474, 476, 482

[56] References Cited

U.S. PATENT DOCUMENTS

| 3,172,091 | 3/1965 | Friend | 340/174.1 |
| 3,272,969 | 9/1966 | Cutaia | 235/61.11 |
| 3,439,354 | 4/1969 | Behr et al. | 340/174.1 |
| 3,914,789 | 10/1975 | Coker, Jr. et al. | 360/2 |
| 4,173,026 | 12/1979 | Deming | 235/482 |
| 4,264,934 | 4/1981 | Mattes | 360/2 |

OTHER PUBLICATIONS

M. G. Wilson, "System for Varying Oscillator Frequency", IBM Technical Disclosure Bulletin, vol. 5, No. 11, Apr. 1963.

Primary Examiner—Vincent P. Canney
Attorney, Agent, or Firm—E. R. Coffman

[57] ABSTRACT

A time base signal for controlling the recording of binary data is developed by measuring the velocity of a magnetic record. The velocity is measured by determining the time interval required for a mark recorded by a write head to move a predetermined distance to a read head.

7 Claims, 3 Drawing Figures

SELF-CLOCKING WRITE HEAD

Reference is made to patent applications, Ser. Nos. 214,318 and 214,319 filed simultaneously herewith, which pertain to related subject matter and are commonly assigned herewith.

The use of magnetic stripe cards for computer data entry has become increasingly popular in recent years. A variety of data entry applications provide simply a slot through which a magnetic stripe card can be moved by hand. The magnetic record, itself, typically follows a self-clocking protocol by which the form of the recorded bit pattern provides a time base reference for its own interpretation. With such a protocol, it is possible to read pre-recorded data with little constraint on the scanning speed. To write data with equal facility, however, it is necessary to supply an external control to cause the spacing between recorded bits to follow certain standards and thereby assure that the data can be subsequently read. This is especially true where the data is to be recorded in a self-clocking protocol.

One approach to the accurate recording of data bits is shown in U.S. Pat. No. 3,914,789. This patent shows a somewhat bulky optical emitter that follows, through mechanical connection, the movement of the card to generate clock pulses in direct synchronism with the card movement. Another technique which is commonly used in a variety of data processing environments for producing clocking pulses, employs a pre-recorded clock reference track that is read from the record during the time that data is being recorded on the primary data track or tracks of the record. This approach, while technically satisfactory as to accuracy and the avoidance of mechanical moving parts, is not compatible with the existing magnetic stripe card products which make no provision for a separate clock reference track.

An object of our invention has been to provide a compact magnetic stripe encoder for recording self-clocking data tracks on a card.

Another object of our invention has been to provide a hand-operated magnetic stripe encoder having substantially no moving parts.

A further object of our invention has been to provide a hand-operated magnetic stripe encoder that is operable upon magnetic stripe cards which are completely compatible with other existing magnetic card readers and encoders.

SUMMARY OF THE INVENTION

These objects of our invention are accomplished by providing apparatus that electronically senses the relative velocity of the card during encoding. The velocity is then employed to control the delivery of clock and data bits to the recording or encoding device such that the bits are recorded at a fixed bit density on the stripe in accordance with a self-clocking protocol regardless of the velocity, or variations in the velocity, at which the card is moved past the encoding station.

The particular velocity measuring technique of our invention provides for the recording of a reference mark or pulse on the magnetic card as it passes a first station, and measuring the amount of time required for that pulse to travel to a second station. From this measurement, the average velocity of the card is computed and control output is created for controlling the time interval between adjacent recorded bits. This process is repeated at intervals during the recording process to update the velocity computation as scanning proceeds.

In the preferred embodiment of our invention, the reference mark is recorded on the same track as the data being controlled. Thus the data is written over the mark which, once detected, is of no further value.

Figure 2:
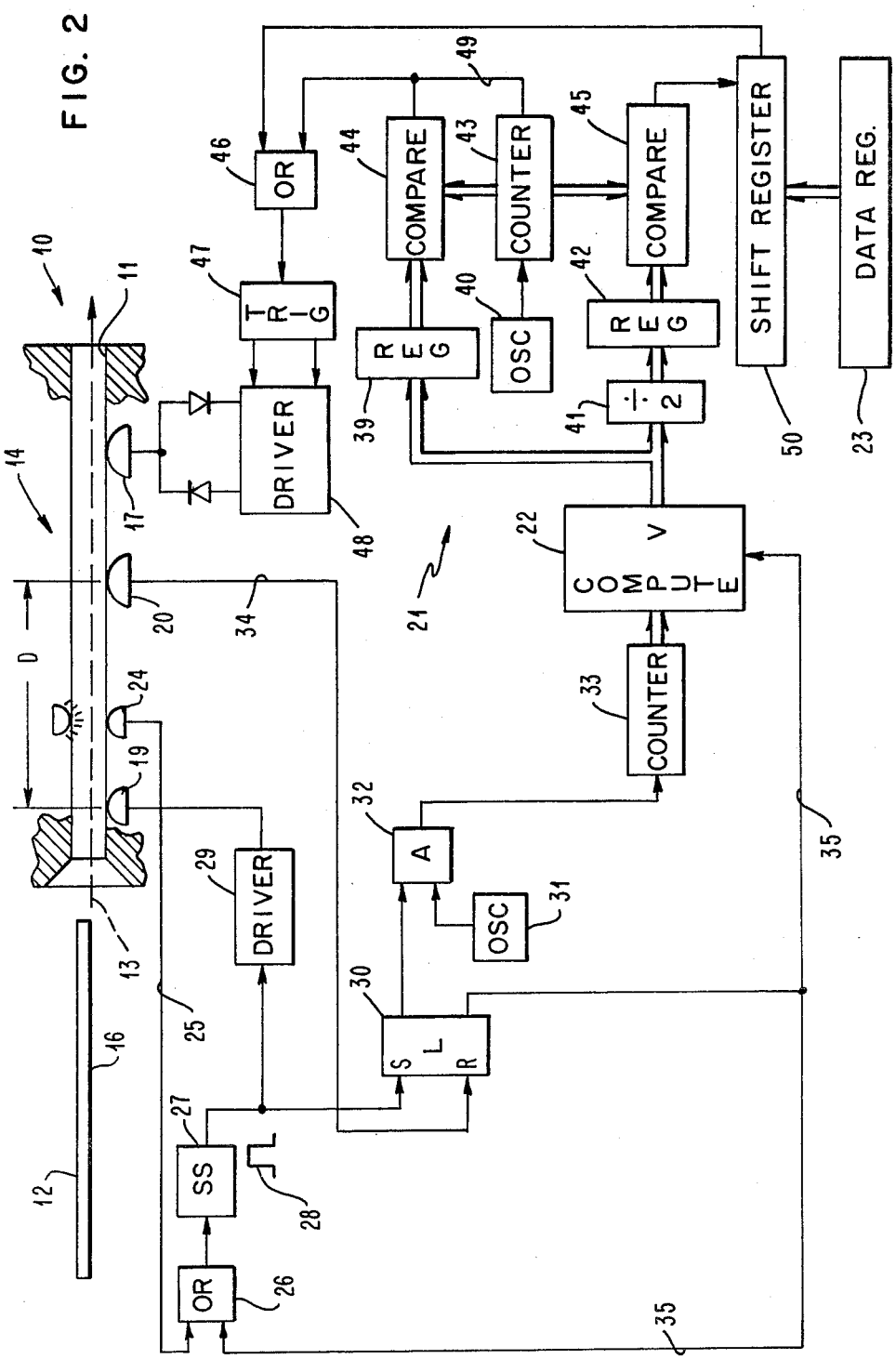

These and other objects, features and advantages of our invention will be apparent to those skilled in the art from reading the following description of a preferred embodiment of my invention wherein reference is made to the accompanying drawings, of which:

FIG. 1 is a perspective, partly broken away view of a magnetic stripe encoder, constructed in accordance with our invention, FIG. 2 is a major function diagram of circuitry illustrating the preferred embodiment of our invention, and FIG. 3 is a diagram showing a particular implementation of computational circuitry used in the circuitry of FIG. 2.

Referring more specifically to FIG. 1, there is shown an encoder or recording station 10, having a slot 11 therein, through which a magnetic record form such as magnetic stripe card 12 can be moved by hand along path 13. A transducer assembly 14, within the encoder 10, operates to record data, supplied from a source (not shown), through the control circuitry in control unit 15 onto the magnetic stripe 16 of the card 12. In the preferred embodiment of our invention, transducer assembly 14 comprises one or more parallel track data recording or encoding heads 17, 18, positioned downstream of a writing head 19 and a reading head 20 which operate to measure the velocity of the card 12 as it passes through slot 11.

Only one pair of velocity measuring heads 19 and 20 are required, regardless of the number of recording heads 17, 18 employed.

Each of the encoding heads 17, 18 etc. is connected to "write" control circuitry 21 which interrelates a time base control derived from velocity computing circuitry 22 with data supplied to data output register 23 for writing binary data on the stripe 16.

The transducer assembly 14 is shown in somewhat diagramatic form in FIG. 2, and consists of the write head or device 19, the read head or device 20 spaced downstream of the write head 19 by a distance D, and an encoding or data recording head 17 which is aligned with devices 19 and 20. An edge detector 24, which can conveniently be a light and photocell pair, is provided to detect the presence of the edge of card 12 as it moves into slot 15.

As card 12 enters slot 11, a magnetic erase field is applied, through conventional means not shown, to remove any previously recorded magnetic marks on stripe 16. When the leading edge of the card 12 is sensed by edge detector 24, a signal on line 25 passes through OR circuit 26 to activate a single shot circuit 27. A square wave output pulse 28 is directed to driver circuit 29 and write head 19 which records a reference pulse or transition on stripe 16. Pulse 28 also acts to set bistable latch 30 to gate pulses from 10 KHz oscillator 31 through AND gate 32 into time lapse measuring counter 33.

Continued movement of card 12 along path 13 will bring the recorded reference mark on stripe 16 to the read head 20 after card 12 has traversed distance D. Read head 20, upon perceiving the mark, provides a derived signal on line 34 that resets latch 30, thereby terminating the counting of pulses by counter 33 and, through control line 35, initiates operation of time base control computational circuitry 22 which acts on the number stored in counter 33.

The signal on line 35 further is supplied to OR circuit 26 to again activate single shot 27 and provide a further measurement operation.

The details of computational circuitry 22 form no part of our invention inasmuch as there exists a variety of well known techniques for accomplishing the necessary mathematic calculation. For example, according to one straight forward technique, a microprocessor is programmed to compute $$V = D/KC_T$$

Where V is the velocity computed,
D is the distance between heads 15 and 20, and
K is a constant of proportionality to connect the pulse count $C_T$ into a direct time measurement
$C_T$ is the count accumulated in counter 19.

Alternatively, prewired computational logic, arranged to provide only this computation, can be employed. Rather than direct calculation of the function V, it is also within the skill of the art to store in table look-up memory the precalculated results of such computations at addresses which respond directly to the count accumulated in counter 33.

FIG. 3 shows such an arrangement for implementing circuitry 22, including a memory 36 having an output register 37 and an input or address register 38. The memory 36 contains a large number of data word storage locations which are each accessible by the address in register 38. The data word stored at each of the addresses is a precalculated number representing the value of V based on the numerical value of the counter 33. Accordingly, after each of the counting or measuring operations, the variable data collected in counter 33 addresses the precalculated answer in memory 36 and presents it to output register 37.

Computational circuitry 22 supplies the result of the function V to "write" control circuitry 21 through output register 39 in the form of a time base control number that is equal to the number of pulses of 150 KHz oscillator 40 required to measure the distance of 0.02 inches between successive to-be-recorded clock pulses. The time base control number is also supplied through divide-by-two circuit 41 to register 42. Thus the contents of register 42 equals the number of pulses from oscillator 40 required to measure the distance of 0.01 inches between a clock transition and a subsequent data transition.

Oscillator 40 continuously delivers pulses to a counter 43, even during non-recording or idle conditions. Counter 43 counts to a fixed number, such as 512, and returns automatically to 0. The content of counter 43 is applied to compare circuits 44 and 45 to produce output pulses therefrom at frequencies that vary with the velocity of card 12. An output will be produced by either compare circuit 44 or 45 when it receives from counter 43 the number applied by circuitry 22 to registers 39 or 42, respectively. The output of circuit 44 is applied to control the writing of clock pulses by write head 17 through OR circuit 46, trigger circuit 47 and driver circuit 48. This output also acts through line 49 to reset counter 43 to its 0 or start condition. The output of circuit 45 is applied to gate a data bit out of shift register 50 to OR circuit 46. Since the protocol for the code to be recorded calls for a series of clock bits initially, shift register 50 will be initially loaded with a series of 0's so that the first recording by write head 17 will be simply clock bits. Shift register 50 is thereafter loaded from a data register 23 with the actual pattern of 1's and 0's to be recorded. Trigger circuit 47 alternates between its two outputs with each application of an input pulse to thereby change the direction of current supply to write head 17, either upon the receipt of a clock bit from compare circuit 44 or a data bit if a "1" is gated from shift register 50.

Those skilled in the art will recognize that while a specific illustrative embodiment of our invention has been disclosed, various modifications and alternatives to this embodiment can be made by those skilled in the art without departing from its underlying principles. In particular, it is possible for the transducing assembly 14 to be mounted on a hand-held device, such that the transducing head is moved manually past a stationary record form. Furthermore, the circuitry shown and particular reference mark described can be varied as required to meet ordinary speed, cost and reliability objectives for a particular implementation. Accordingly, the scope of my invention is intended to be limited only by the language of the appended claims.

We claim:

1. In a magnetic recording system wherein a magnetic record form and a transducing assembly including a data recording means are moved relatively, one with respect to the other, along a path and wherein the system includes control circuitry responsive to a time base control and a data signal for controlling the recording of data on said record form, the improved transducing assembly comprising, in combination:

a writing device,
a reading device aligned with said writing device along said path and spaced downstream therefrom in relation to the direction of said relative movement,
variable frequency generating means connected to said control circuitry,
a reference signal generator for delivering a reference signal to said writing device to record an indication thereof on said record,
said reading device producing a derived signal in response to reading of said recorded indication of said reference signal,
means for measuring the time lapse between said reference signal and said derived signal,
time base control computing means responsive to said measuring means for controlling said variable frequency generating means in accordance with the relative velocity of said record form and said transducing assembly, and
means automatically causing a further operation of said reference signal generator to deliver a further reference signal to said writing device whereby a revised variable frequency is obtained upon changes in relative velocity.

2. A magnetic recording system, as defined in claim 1, wherein said data recorded on said record form includes indications of a time base implicit therein.

3. Magnetic recording apparatus, as defined in claim 1, wherein said data recording means includes a transducer positioned in substantial alignment with said writing and reading devices and is positioned downstream thereof in the direction of relative movement of said record form.

4. Magnetic recording apparatus, as defined in claim 1, wherein said variable frequency generating means includes means for measuring the time lapse between said reference signal and said derived signal.

5. Magnetic recording apparatus, as defined in claim 1, further comprising guide means for directing said magnetic record form for manual movement along said path.

6. Magnetic recording apparatus, as defined in claim 1, wherein said time lapse measuring means comprises a counter.

7. Magnetic recording apparatus, as defined in claim 3, wherein said data recording means further comprises at least one additional transducer positioned out of alignment with writing and reading devices.

* * * * *